(12) United States Patent
Tung et al.

(10) Patent No.: US 6,209,777 B1
(45) Date of Patent: Apr. 3, 2001

(54) FUSION WELDING METHOD FOR BINDING SURFACES OF TWO METALS

(75) Inventors: Chao-nien Tung; Tien-tzu Chuang, both of Hsinchu (TW)

(73) Assignee: New Century Technology Co., Ltd., Hsinchu (TW)

( * ) Notice: Subject to any disclaimer, the term of this patent is extended or adjusted under 35 U.S.C. 154(b) by 0 days.

(21) Appl. No.: 09/394,910

(22) Filed: Sep. 13, 1999

(51) Int. Cl.⁷ .............................. B23K 31/02; B23K 1/19; B23K 20/16

(52) U.S. Cl. ................... 228/248.1; 228/262.3; 228/262.41; 228/262.71

(58) Field of Search ............................. 228/248.1, 193, 228/194, 234.1, 262.3, 262.41, 262.71

(56) References Cited

U.S. PATENT DOCUMENTS

| | | | |
|---|---|---|---|
| 3,716,347 | * 2/1973 | Bergstrom et al. | 29/182.2 |
| 4,228,944 | * 10/1980 | Inamura et al. | 228/198 |
| 4,289,833 | * 9/1981 | Hachisuka | 428/544 |
| 4,300,951 | * 11/1981 | Hachisuka | 75/236 |
| 4,591,480 | * 5/1986 | Morishita et al. | 419/9 |
| 5,154,425 | * 10/1992 | Niskanen et al. | 273/167 |
| 5,356,453 | * 10/1994 | Takata | 75/244 |
| 5,812,925 | * 9/1998 | Ecer | 428/548 |

FOREIGN PATENT DOCUMENTS

| | | | |
|---|---|---|---|
| 408238340 | * | 9/1976 | (JP) . |
| 357022867 | * | 2/1982 | (JP) . |
| 409024122 | * | 1/1997 | (JP) . |
| 410146404 | * | 6/1998 | (JP) . |

* cited by examiner

*Primary Examiner*—Geoffrey S. Evans
*Assistant Examiner*—Kiley Stoner
(74) *Attorney, Agent, or Firm*—Bacon & Thomas

(57) ABSTRACT

A fusion welding method for binding the surfaces of two metals including the steps of (a) coating a layer of a powdery media capable of forming eutectics with both the two metals for lowering the melting points of the two metals, onto at least one of the binding surfaces of the two metal to be bound; and (b) sintering, in a vacuum furnace, the two metals with said powdery media being coated on their binding surfaces as produced in step (a) until the two metals are fused together by eutectic welding, and the sintering temperature being controlled at a temperature higher than the eutectic points of the two metals and the powdery medium, but lower than the melting points of the two metals.

6 Claims, 3 Drawing Sheets

FUSION WELDING METHOD FOR BINDING SURFACES OF TWO METALS

BACKGROUND OF THE INVENTION

1. Field of the Invention

The present invention relates to a fusion welding method for binding the surfaces of two metals, and particularly to a fusion welding method by applying a powdery medium on the metal binding surfaces so as to form eutectics at same surfaces upon sintering the surfaces in vacuum, thereby fusing and welding the binding surfaces of the two metals together.

2. Description of Prior Art

Conventionally, "welding" process carried out at a higher temperature has normally been adopted for binding two metals so as to obtain a higher binding strength as compared with the case of "soldering" process carried out at a temperature below 450° C. by employing lower melting point solder such as tin or lead. Instead of lower melting point solder used in "soldering", brazing solder of higher melting point, mainly composed of noble metals containing gold, silver, copper, nickel, etc, is usually used in "welding" process. Brazing solder composed of the above noble metals mixed by certain ratio will form eutectics, thus lowering the melting point of the brazing solder, which is normally in the range of about 600° C. to 1100° C. that may be selected depending on welding condition.

For instance, in the fabrication of the head portion of the golf club, the bottom of the head portion needs to be bound with a weight of a higher specific gravity so as to lower the center of gravity of the head portion. As a result, an initial swing of the club can hit the ball to a further distance. In addition, the hitting plate of the head portion should be made of composite materials formed through special metal processing or heat treatment so as to obtain high strength and high coefficient of elasticity. Thus, the hitting plate may withstand impact and may produce a light sound upon hitting the ball. FIG. 1 shows a schematic view illustrating the binding of a weight to the head portion of the golf club by a conventional welding method. First, provide a recess 111 in the bottom surface 11 of the head portion. Then, coat a layer of brazing solder 12 on the bottom surface of the recess 111, and press a weight 13 to fit into the recess 111 over the layer of brazing solder 12. Subsequently, the entire structure is placed into a vacuum furnace for sintering at a temperature slightly higher than the eutectic point of the brazing solder 12. Through such a sintering process in vacuum, the brazing solder 12 melts first, and then, under high temperature, the melt brazing solder 12 penetrates into the bottom surface 11 and the weight 13 due to capillary penetration, so as to bind the bottom surface 11 and the weight 13 together.

Though the above conventional welding method is superior to soldering method in its obtainable binding strength, it suffers from the below drawbacks:
1. Expensive brazing solder composed of noble metals;
2. Relatively higher binding cost;
3. Necessity of pressing the two metals to be bound against each other;
4. Restriction to the thickness of the coated brazing solder;
5. Necessity of relatively precise control in welding process for obtaining better binding effect; and
6. Poor welding effect if the metal to be bound has a density larger than 14 g/cm$^3$ because, in this case, capillary penetration becomes poor.

FIG. 2 shows another conventional way of attaching a weight to the head portion of the golf club. A weight 13 is screw fastened to the bottom surface 11 of the head portion by a plurality of (only one is shown in FIG. 2) screws 14 made of titanium for improving the rust protection effect and obtaining higher fastening strength at the fastened portion. Each screw 14 penetrates through a through hole 131 provided in the weight 13 and then threaded into a screw hole 112 provided in the bottom surface 11 corresponding to a through hole 131. After that, the heads of the screws 14 are polished to provide an overall aesthetic appearance.

This conventional method of screw fastening two metals has the drawbacks as follows:
1. The cost of fabrication is high because titanium screw is expensive and a polishing step must be employed.
2. In the state wherein the weight 13 is screw fastened to the bottom surface 11, a gap is always remained between the weight 13 and the recess 111. This gap differs from one golf club to another due to the fabrication precision of the weight 13 and the recess 111, or due to difference in the applied force for tightening the screws 14. The unevenness in the gap between the weight 13 and the recess 111 of the bottom surface 11 will cause difference in the sound produced when the head portion of the golf club hits a ball, thus resulting in unevenness in the quality of the golf club. Consequently, its is difficult to control the quality of the produced golf club by use of this conventional method.

SUMMARY OF THE INVENTION

Accordingly, one object of the present invention is to provide a fusion welding method for metal binding surfaces, wherein the metal binding surfaces per se are melted as a result of eutectic phenomenon so as to provide a binding effect.

Another object of the present invention is to provide a method of binding a weight to the head portion of a golf club, wherein the metal binding surfaces per se are melted as a result of eutectic phenomenon so as to provide a high binding strength. This is a simple method of binding the weight to the head portion, and at the same time, the cost of production is lowered.

Another object of the present invention is to provide a method of binding the hitting plate of the head portion of the golf club, wherein the metal binding surfaces per se are melted as a result of eutectic phenomenon so as to provide a high binding strength. This is a simple method of binding the hitting plate to the head portion, and at the same time, the cost of production is lowered.

For achieving the above objects, a fusion welding method for binding the surfaces of two metals according to the present invention comprises the steps of (a) selecting a first metal member from one of Ni—Fe—W alloy and stainless steel; (b) selecting a second metal member from one of Ni—Fe—W alloy and stainless steel; (c) applying Carbon powder onto a binding surface of at least one of the two metal members, the Carbon powder capable of forming a fusion region with the two metal members at an eutectic temperature; (d) heating the two metal members with the Carbon powder in a vacuum furnace at a sintering temperature higher than the eutectic temperature of the fusion region and lower than the melting temperatures of the two metal members.

BRIEF DESCRIPTION OF THE DRAWING

Other advantageous features will become apparent upon reference to the attached drawings, when read in light of the description of the preferred embodiments.

DETAILED DESCRIPTION OF THE PRESENT INVENTION

Embodiment 1

Figure 1:
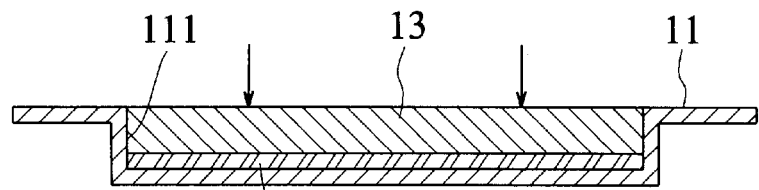
FIG. 1 is a schematic view illustrating the binding of a weight to the bottom surface of the golf club by a conventional welding method.
Figure 3:
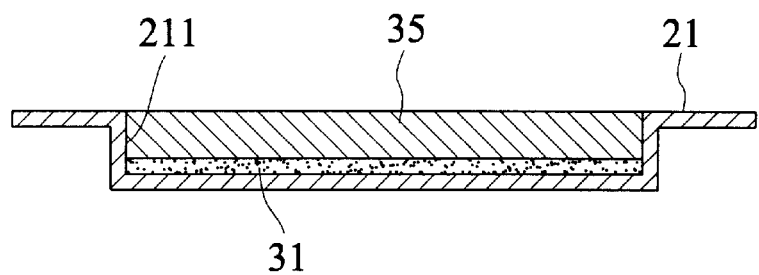
FIG. 3 is a schematic view illustrating the binding of a weight to the head portion of the golf club in accordance with the present invention.

A method of binding a weight to the head portion of a golf club according to Embodiment 1 of the present invention will now be described by referring to FIG. 3. In accordance with this method, a weight 35 made of Ni—Fe—W alloy (Ni=43%, Fe=21%, W=36%) is bound to the bottom surface 21 of the head portion made of stainless steel.

First, a recess 211 for accommodating the weight 35 is provided in the bottom surface 21 of the head portion. Then, a powdery medium 31 capable of forming eutectic with both the metal at the bottom surface 21 of the head portion, and the metal of the weight 35 so as to lower the melting points is coated onto the recess 211. Next, the weight 35 is accommodated into the recess 211 and delivered to a vacuum furnace together for sintering. The sintering temperature is controlled at a temperature, about 1200 to 1350° C. in this embodiment, which is higher than the eutectic points of the powder medium and the two metals to be bound, but lower than the melting points of the two metals. Thus, the two metals are bound together through eutectic welding.

As described above, in a conventional welding method, welding effect, achieved through capillary penetration of brazing solder into the two metals to be bound together, deteriorates if the metal to be bound has a density larger than 14 g/cm$^3$ because capillary penetration of brazing solder becomes poor under such situation. In comparison, welding effect achievable by fusion welding (eutectic welding) method according to the present invention does not deteriorate even if the metal to be bound has a density larger than 14 g/cm$^3$ since binding of the two metals does not depend on capillary penetration of the employed brazing solder but on the fusion welding (eutectic welding) at the binding surfaces the two metals per se.

In accordance with the present invention, the temperature of sintering depends also on the required sintering time. When the sintering temperature is higher, the required sintering time is shorter, and vice versa. In this embodiment, the preferred sintering temperature is about 1300° C., the required sintering time is about 40 mins, and the vacuum of the vacuum furnace is in the range from 10$^{-1}$ torr to 10$^{-5}$ torr.

Figure 6:
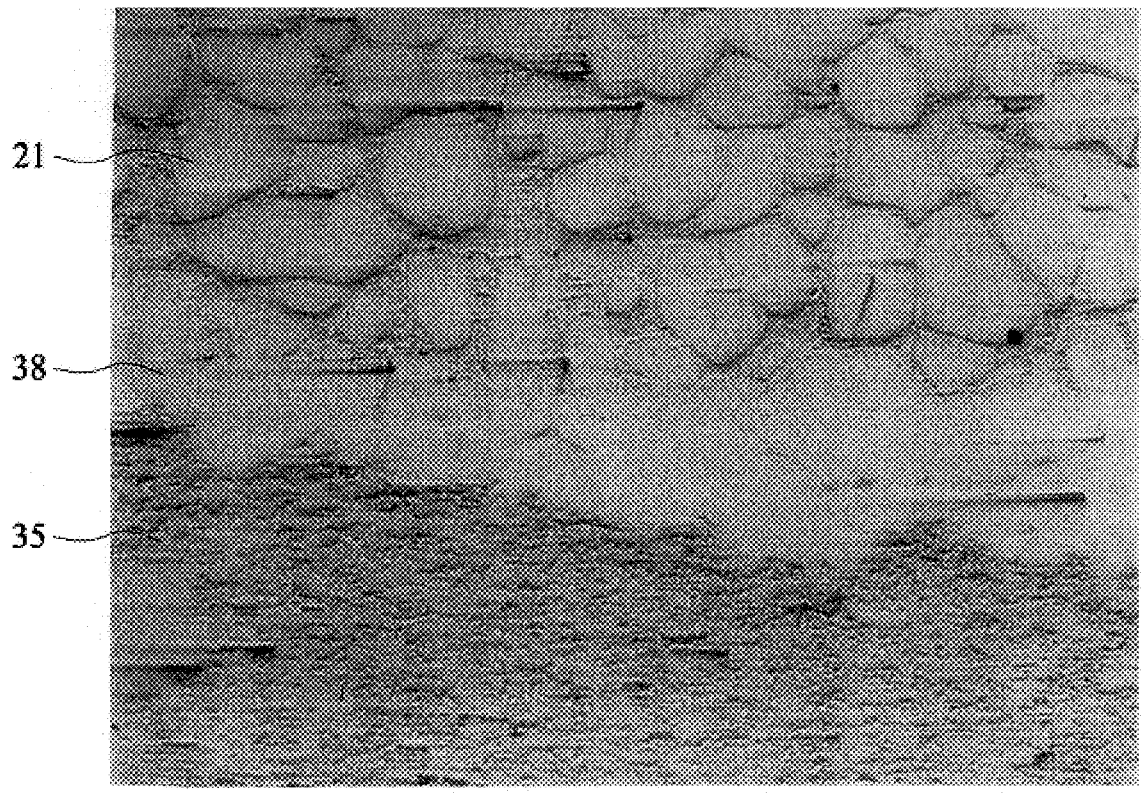
FIG. 6 is a sectional enlarged view of the head portion of the golf club binding with the weight in accordance with the present invention.

FIG. 6 is a 100 times enlarged photograph showing the sectional structure of the sintered portion of the thus formed product. As shown in this photograph, the two binding surfaces of the bottom surface 21 of the head portion and the weight 35 have been well melted and fused to form a fusion region 38. The two surfaces have been soundly bound together.

Embodiment 2

In accordance with the method of Embodiment 2, a weight 35 made of Ni—Fe—W alloy is bound to the bottom surface 21 of the head portion made of stainless steel just like the situation in Embodiment 1. However, the powdery medium 31 employed in this embodiment is titanium powder. The sintering temperature is in the range from 1300° C. to 1400° C., and the required sintering time is about 15 to 60 mins. The vacuum of the vacuum furnace is in the range from 10$^{-1}$ torr to 10$^{-5}$ torr.

Embodiment 3

In accordance with the method of Embodiment 3, a weight 35 made of Ni—Fe—W alloy is bound to the bottom surface 21 of the head portion made of titanium alloy. The powdery medium employed in this embodiment is nickel powder. The sintering temperature is in the range from 800° C. to 1100° C., and the required sintering time is about 10 to 40 mins. The vacuum of the vacuum furnace is in the range from 10$^{-1}$ torr to 10$^{-5}$ torr.

Embodiment 4

This embodiment relates a method of binding a hitting plate to the head portion of a golf club.

Figure 4:
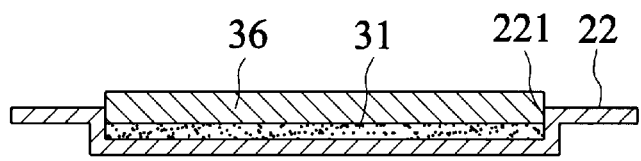
FIG. 4 is a schematic view illustrating the binding of a hitting plate to the head portion of the golf club in accordance with the present invention.

Referring to FIG. 4, a recess 221 for accommodating a hitting plate 36 is first provided in the hitting face 22 of the head portion of the golf club. Then, a powdery medium 31 capable of forming eutectic with both the metal at the bottom surface 21 of the head portion, and the metal of the hitting plate 36 so as to lower the melting points is coated onto the recess 221. Next, the hitting plate 36 is accommodated into the recess 221 and delivered to a vacuum furnace together for sintering. The sintering temperature is controlled at a temperature higher than the eutectic points of the powder medium and the two metals to be bound, but lower than the melting points of the two metals. Thus, the two metals are bound together through eutectic welding.

In this embodiment, a hitting plate 36 made of titanium alloy, to which particular metal processing or heat treatment is applied in advance for improving its coefficient of elasticity, is bound to the hitting face 22 of the head portion also made of titanium alloy. The powdery medium 31 employed in this embodiment is nickel powder. The sintering temperature is in the range from 800° C. to 1,000° C., and the required sintering time is about 10 to 40 mins. The vacuum of the vacuum furnace is in the range from 10$^{-1}$ torr to 10$^{-5}$ torr.

Figure 5:
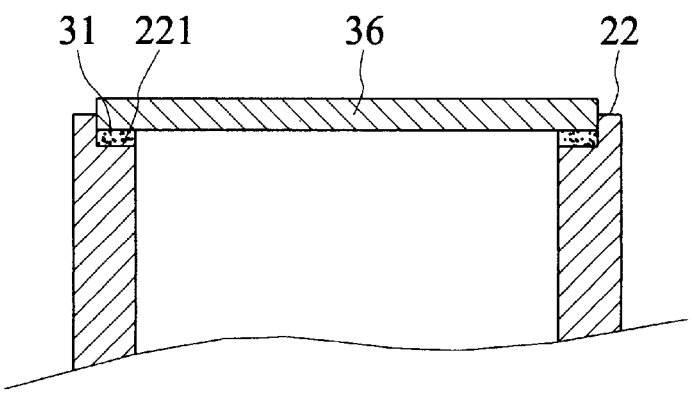
FIG. 5 is another schematic view of binding a hitting plate to the head portion of the golf club in accordance with the present invention.
Figure 2:
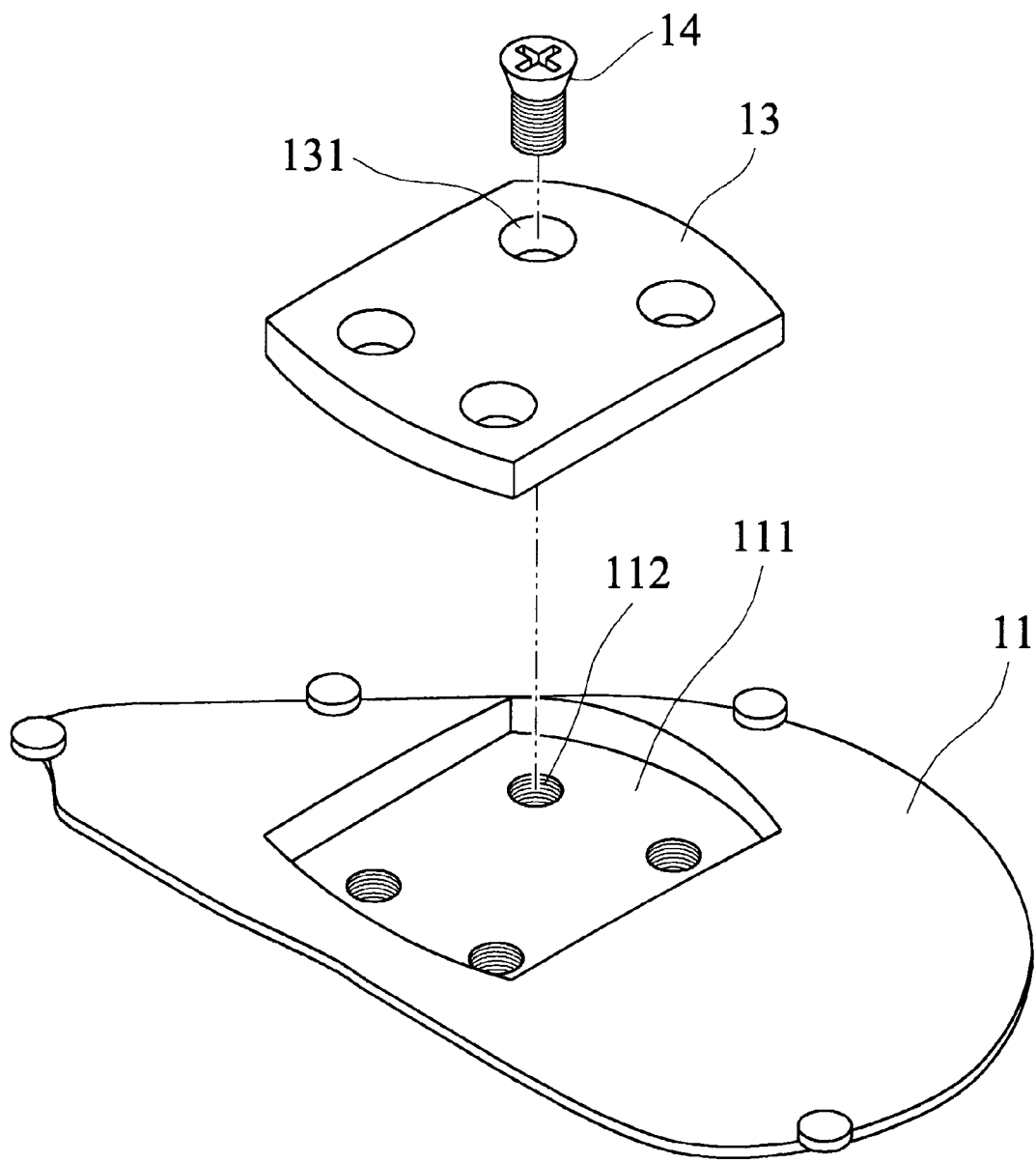
FIG. 2 is a schematic view illustrating the binding of a weight to the bottom surface of the golf club by using a conventional screw fastening method.

Referring to FIG. 5, the recess 221 of the hitting face 22 may also be made into an annular shape with the central portion of the recess 221 being hollow, and the hitting plate 36 is welded with the recess 221 only along its boundary.

Embodiment 5

According to this embodiment, in the above method of binding a hitting plate to the head portion of a golf club, the hitting face 22 in the head portion of the golf club is made of stainless steel, and the hitting plate 36 is also made of stainless steel, to which particular metal processing or heat treatment is applied in advance for improving its coefficient of elasticity. The powdery medium 31 employed is a carbon powder. The sintering temperature is in the range from 1100° C. to 1300° C., and the required sintering time is about 15 to 60 mins. The vacuum of the vacuum furnace is in the range from 10$^{-1}$ torr to 10$^{-5}$ torr.

Embodiment 6

According to this embodiment, in the above method of binding a hitting plate to the head portion of a golf club, the hitting face 22 in the head portion of the golf club is made of stainless steel, while the hitting plate 36 is made of titanium alloy, to which particular metal processing or heat treatment is applied in advance for improving its coefficient of elasticity. The powdery medium 31 employed is a mixture of carbon powder and nickel powder by equal proportion. The sintering temperature is in the range from 1100° C. to 1300° C., and the required sintering time is about 15 to 60 mins. The vacuum of the vacuum furnace is in the range from $10^{-1}$ torr to $10^{-5}$ torr.

In view of the above embodiments, the advantages of the present method may be summarized as follows:

(1) Binding strength of the two metals is quite high because binding of the two metals does not depend on the employed brazing solder but on the fusion welding (eutectic welding) at the binding surfaces the two metals per se.

(2) Manufacturing cost is greatly reduced because noble metallic solder is not required.

(3) Binding strength is very high and the fabrication process is quite simple with respect to binding of the hitting plate or the weight to the head portion of the golf club. Thus, manufacturing cost is lowered.

(4) No welding gap exists in the binding portion of the weight to the head portion of the golf club. Hence, sound of the head portion produced upon hitting a ball substantially remains unchanged from one golf club to another and thus the quality of product is stable.

(5) Welding effect does not deteriorate even if the metal to be bound has a density larger than 149/cm$^3$ since binding of the two metals to be bound does not depend on capillary penetration of the employed brazing solder but on the fusion welding (eutectic welding) at the binding surfaces the two metals per se.

In fact, the head portion of a golf club is formed by binding several plates together. Though the above description in the embodiments of the present invention has been made with respect to binding of a weight or a hitting plate to the head portion, it should be clear that the present invention is not to be construed as limited to the preferred embodiments which are to be considered illustrative rather than restrictive. Mounting of other portions constituting the head portion of a golf club by similar methods as described above should also belong to the scope of the present invention.

What is claimed is:

1. A fusion welding method for binding two metal members, comprising the steps of:
   (a) selecting a first metal member which is a Ni—Fe—W alloy;
   (b) selecting a second metal member which is stainless steel;
   (c) applying Carbon powder onto a binding surface of at least one of said two metal members, said Carbon powder capable of forming a fusion region with said two metal members at an eutectic temperature; and
   (d) heating said two metal members with said Carbon powder in a vacuum furnace at a sintering temperature which is controlled in the range between about 1200° C. to about 1350° C.

2. A fusion welding method as set forth in claim 1, wherein the vacuum of said vacuum furnace is in the range between about $10^{-1}$ torr to about $10^{-5}$ torr.

3. A method for binding a weight to a head portion of a golf club, said head portion having a recess at the bottom surface thereof for joining said weight, comprising the steps of:
   (a) selecting a first metal member made of stainless steel for said bottom surface of said head portion of said golf club;
   (b) selecting a second metal member which is a Ni—Fe—W alloy stainless for said weight;
   (c) applying Carbon powder onto said recess at said bottom surface of said head portion, said Carbon powder capable of forming a fusion region with said bottom surface of said head portion and a binding surface of said weight at an eutectic temperature;
   (d) heating said golf club with said Carbon powder in a vacuum furnace at a sintering temperature which is controlled in the range between about 1200° C. to about 1350° C.

4. A method for binding a weight to a head portion of a golf club as set forth in claim 3, wherein the vacuum of said vacuum furnace is in the range between $10^{-1}$ torr to $10^{-5}$ torr.

5. A method for binding a hitting plate to a head portion of a golf club, said head portion having a recess at a hitting face thereof for joining said hitting plate, comprising the steps of:
   (a) selecting a first metal member which is stainless steel for said hitting face of said head portion of said golf club;
   (b) selecting a second metal member which is Titanium alloy for said hitting plate;
   (c) applying powder which is a mixture of Carbon and Nickel onto said recess at said hitting face of said head portion, said powder capable of forming a fusion region with said hitting face of said head portion and a binding surface of said hitting plate at an eutectic temperature; and
   (d) heating said golf club with said powder in a vacuum furnace at a sintering temperature which is controlled in the range between about 1100° C. to about 1300° C.

6. A method for binding a hitting plate to a head portion of a golf club as set forth in claim 5, wherein said mixture of Carbon and Nickel is in equal proportion.

* * * * *